(12) United States Patent
Chatani et al.

(10) Patent No.: US 10,730,992 B2
(45) Date of Patent: Aug. 4, 2020

(54) CURABLE COMPOSITION, ADHESIVE, ARTICLE HAVING COATING LAYER, FIBER-REINFORCED COMPOSITE MATERIAL AND CURABLE COMPOSITION KIT

(71) Applicant: Mitsubishi Chemical Corporation, Chiyoda-ku (JP)

(72) Inventors: Shunsuke Chatani, Tokyo (JP); Hiromi Aso, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 15/963,558

(22) Filed: Apr. 26, 2018

(65) Prior Publication Data

US 2018/0237576 A1 Aug. 23, 2018

Related U.S. Application Data

(63) Continuation of application No. PCT/JP2016/081811, filed on Oct. 27, 2016.

(30) Foreign Application Priority Data

Nov. 4, 2015 (JP) ................................ 2015-216974

(51) Int. Cl.
| | | |
|---|---|---|
| C08G 18/73 | (2006.01) | |
| C08G 18/38 | (2006.01) | |
| C08J 5/04 | (2006.01) | |
| C09D 175/04 | (2006.01) | |
| C09J 175/04 | (2006.01) | |
| C08J 5/10 | (2006.01) | |
| C08G 18/16 | (2006.01) | |

(52) U.S. Cl.
CPC ....... *C08G 18/3876* (2013.01); *C08G 18/168* (2013.01); *C08G 18/73* (2013.01); *C08J 5/04* (2013.01); *C08J 5/10* (2013.01); *C09D 175/04* (2013.01); *C09J 175/04* (2013.01); *C08J 2375/04* (2013.01)

(58) Field of Classification Search
CPC .. C08G 18/3876; C08G 18/168; C08G 18/73; C08J 5/10; C08J 5/04; C09J 175/04; C09D 175/04
See application file for complete search history.

(56) References Cited

U.S. PATENT DOCUMENTS

| | | | |
|---|---|---|---|
| 6,225,021 B1 | 5/2001 | Widawski et al. | |
| 2011/0224371 A1 | 9/2011 | Ryu et al. | |
| 2015/0031782 A1 | 1/2015 | Bowman et al. | |

FOREIGN PATENT DOCUMENTS

| | | |
|---|---|---|
| CN | 103930458 A | 7/2014 |
| JP | 10-81726 | 3/1998 |
| JP | 2002-121379 | 4/2002 |
| JP | 2003-526722 | 9/2003 |
| JP | 2007-246690 | 9/2007 |
| WO | WO 01/68736 A1 | 9/2001 |
| WO | WO 2010/067489 A1 | 6/2010 |

OTHER PUBLICATIONS

Korean Office Action dated Apr. 23, 2019 in Patent Application No. 10-2018-7011398, 6 pages (with unedited computer generated English translation).
International Search Report dated Jan. 31, 2017 in PCT/JP2016/081811, filed on Oct. 27, 2016 (with English Translation).
Chatani, S., et al. "Temporal Control of Thiol-Click Chemistry", Chemistry of Materials, 2013, 25, pp. 3897-3901.
Chinese Office Action dated Jun. 11, 2020, in Chinese Patent Application No. 201680063289.9 (with English Translation).

*Primary Examiner* — Peter D. Mulcahy
(74) *Attorney, Agent, or Firm* — Oblon, McClelland, Maier & Neustadt, L.L.P.

(57) ABSTRACT

The present invention relates to a curable composition containing a thiol compound (A) having at least two thiol groups in a molecule thereof, an isocyanate compound (B) having at least two isocyanate groups in a molecule thereof, a phosphine compound (C), an acid (D) having an acid dissociation constant (pKa) of 3 or less relative to water, and a Michael acceptor (E); wherein, the content of the phosphine compound (C) is 1.3% by mass or less based on 100% by mass of the curable composition.

12 Claims, No Drawings

CURABLE COMPOSITION, ADHESIVE, ARTICLE HAVING COATING LAYER, FIBER-REINFORCED COMPOSITE MATERIAL AND CURABLE COMPOSITION KIT

TECHNICAL FIELD

The present invention relates to a curable composition, adhesive using the same, an article having a coating layer, a fiber-reinforced composite material, and a curable composition kit.

The present application claims priority on the basis of Japanese Patent Application No. 2015-216974, filed in Japan on Nov. 4, 2015, the contents of which are incorporated herein.

BACKGROUND ART

Thiourethane resins are resins having a thiourethane group that are formed by reacting a thiol group of a thiol compound having at least two thiol groups in a molecule thereof, and an isocyanate group of an isocyanate compound having at least two isocyanate groups in a molecule thereof.

The following lists examples of the characteristics of thiourethane resins.

- Thiourethane resins are used in a wide range of applications such as adhesives, coating agents or the matrix of fiber-reinforced composite materials since they have properties resembling those of urethane resins and have superior toughness, impact resistance and abrasion resistance.
- Thiourethane resins are also used in optical substrates due to their high refractive index (Patent Document 1).
- The reaction between a thiol group of a thiol compound and an isocyanate group of an isocyanate compound proceeds rapidly due to the presence of a catalyst such as a basic compound or phosphine compound (Patent Document 2). Consequently, it is not necessary to use a tin-based catalyst, for which there are concerns over toxicity, used in the production of urethane resins.

The thiol compound and isocyanate compound serving as raw materials of thiourethane resins are frequently used as two-component curable compositions. A cured product in the form of the thiourethane resin is obtained by mixing a composition containing a thiol compound and a composition containing an isocyanate compound in the presence of a catalyst. From the viewpoint of handling ease of the two-component curable composition, the duration of pot life until gelling begins after having mixed the two compositions is preferably long to a certain degree. However, if the amount of catalyst is reduced in order to extend pot life, there is the problem of the curing time from the time gelling begins until a certain hardness is reached also becoming long.

A method has been proposed for realizing both short curing time and long pot life that consists of reacting a thiol group of a thiol compound with an isocyanate group of an isocyanate compound using a co-catalyst composed of a phosphine compound, Michael acceptor and methanesulfonic acid (Non-Patent Document 1).

This publication indicates that the use of this co-catalyst allows the obtaining of a pot life of several minutes to 13 minutes.

PRIOR ART DOCUMENTS

Patent Documents

Patent Document 1: Japanese Unexamined Patent Application, First Publication No. 2007-246690
Patent Document 2: Japanese Translation of PCT Application No. 2003-526722

Non-Patent Documents

Non-Patent Document 1: Chem. Mater., 2013, 25, 3897-3901

DISCLOSURE OF THE INVENTION

Problems to be Solved by the Invention

However, in the method described in Non-Patent Document 1, it is necessary to increase the amount of acid in order to make the pot life longer than 13 minutes. However, since defective curing of the curable composition occurs if the amount of acid is excessively large, there are limitations on the degree to which pot life can be extended. In addition, since the phosphine compound is difficult to dissolve in the composition, time is required to prepare the composition containing the phosphine compound.

An object of the present invention is to provide a curable composition that enables pot life to be precisely controlled to an arbitrary time in the reaction between a thiol group of a thiol compound and an isocyanate group of an isocyanate compound while also not requiring time for preparing the composition, an adhesive having superior handling ease when adhering two objects to be adhered, an article having superior toughness, impact resistance and abrasion resistance of the coating layer thereof, a fiber-reinforced composite material having superior impregnability of the matrix into the reinforcing fibers, toughness, impact resistance and abrasion resistance, and a two-component curable composition kit having superior toughness that enables pot life to be precisely controlled to an arbitrary time in a reaction between a thiol group of a thiol compound and an isocyanate group of an isocyanate compound when mixed, without requiring an excessively long time to prepare a composition containing a phosphine compound, and without undergoing changes over time during storage.

Means for Solving the Problems

The present invention comprises the aspects indicated below.

<1>A curable composition, containing: a thiol compound (A) having at least two thiol groups in a molecule thereof, an isocyanate compound (B) having at least two isocyanate groups in a molecule thereof, a phosphine compound (C), an acid (D) having an acid dissociation constant (pKa) of 3 or less relative to water, and a Michael acceptor (E); wherein, the content of the phosphine compound (C) is 1.3% by mass or less based on 100% by mass of the curable composition.

<2>The curable composition of <1>above, wherein the acid (D) is an acid other than methanesulfonic acid.

<3>The curable composition of <1>or <2>above, wherein the acid (D) is an aromatic sulfonic acid.

<4>The curable composition of any of <1>to <3>above, wherein the phosphine compound (C) is a compound represented by the following formula (I):

[Chemical Formula 1]

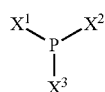

(I)

wherein, $X^1$, $X^2$ and $X^3$ respectively represent an alkyl group having 1 to 8 carbon atoms, alkoxy group having 1 to 8 carbon atoms, alkenyl group having 1 to 8 carbon atoms, alkynyl group having 1 to 8 carbon atoms, cycloalkyl group having 3 to 6 carbon atoms, phenyl group, biphenyl group, naphthyl group, phenoxy group or heterocyclic group, $X^1$, $X^2$ and $X^3$ may have a substituent, and the substituent is at least one group selected from the group consisting of a halogen atom, alkyl group having 1 to 8 carbon atoms, alkoxy group having 1 to 8 carbon atoms, alkenyl group having 1 to 8 carbon atoms, alkynyl group having 1 to 8 carbon atoms, cycloalkyl group having 3 to 6 carbon atoms, amino group, alkylamino group having 1 to 8 carbon atoms, nitro group, phenyl group, biphenyl group, naphthyl group, phenoxy group and heterocyclic group.

<5>The curable composition of any of <1>to <4>above, wherein the molar ratio ((D)/(C)) of the acid (D) to the phosphine compound (C) is 0.001 to 1.

<6>The curable composition of any of <1>to <5>above, wherein the pot life relative to the added amount (mg) of the acid (D) per gram of the curable composition is 1000 sec/mg to 10000 sec/mg.

<7>An adhesive containing the curable composition of any of <1>to <6>above.

<8>An article having a coating layer composed of a cured product of the curable composition of any of <1>to <6>above.

<9>A fiber-reinforced composite material containing a matrix, composed of a cured product of the curable composition of any of <1>to <6>above, and reinforcing fibers.

<10>A curable composition kit, having: a first container housing a composition (X) containing a thiol compound (A) having at least two thiol groups in a molecule thereof, a phosphine compound (C) and an acid (D) having an acid dissociation constant (pKa) of 3 or less relative to water, but not containing the following isocyanate compound (B) or the following Michael acceptor (E); and, a second container housing a composition (Y) containing the isocyanate compound (B) having at least two isocyanate groups in a molecular thereof and the Michael acceptor (E), but not containing the thiol compound (A), the phosphine compound (C) or the acid (D).

<11>The curable composition kit of <10>above, wherein the content of the phosphine compound (C) is 1.3% by mass or less based on 100% by mass of the total mass of the composition (X) and the composition (Y).

<12>The curable composition kit of <10>or <11>above, wherein the acid (D) is an acid other than methanesulfonic acid.

Effects of the Invention

The curable composition of the present invention enables pot life to be precisely controlled to an arbitrary time in a reaction between a thiol group of a thiol compound and an isocyanate group of an isocyanate compound, and does not require an excessively long amount of time to prepare the composition.

The adhesive of the present invention has superior handling ease when adhering objects to be adhered.

The article of the present invention demonstrates superior toughness, impact resistance and abrasion resistance of the coating layer thereof.

The fiber-reinforced composition material of the present invention demonstrates superior impregnability of the matrix into the reinforcing fibers, toughness, impact resistance and abrasion resistance.

The curable composition kit of the present invention is able to provide a two-component curable composition having superior toughness that enables pot life to be precisely controlled to an arbitrary time in a reaction between a thiol group of a thiol compound and an isocyanate group of an isocyanate compound when mixed, without requiring an excessively long time to prepare a composition containing a phosphine compound, and without undergoing changes over time during storage.

BEST MODE FOR CARRYING OUT THE INVENTION

Definitions of the following terms are applied in the present description and claims.

"Acid dissociation constant (pKa)" is that value in the case the value is known in the literature, or is a calculated value determined using Advanced Chemistry Development (ACD/Labs) software in the case the value is not known in the literature.

"Michael acceptor" refers to an electron-deficient alkene that is the target of 1,4-addition by a nucleophilic agent in a Michael addition reaction.

"(Meth)acrylic acid" is the collective term for acrylic acid and methacrylic acid, while "(meth)acrylate" is the collective term for acrylate and methacrylate.

<Curable Composition>

The curable composition of the present invention contains a thiol compound (A) having at least two thiol groups in a molecule thereof, an isocyanate compound (B) having at least two isocyanate groups in a molecule thereof, a phosphine compound (C), an acid (D) having an acid dissociation constant (pKa) of 3 or less relative to water, and a Michael acceptor (E).

(Thiol Compound (A))

Examples of thiol compound (A) include aliphatic polythiol compounds, aromatic polythiol compounds, aromatic polythiol compounds having a sulfur atom other than a thiol group (mercapto group), and aliphatic polythiol compounds having a sulfur atom other than a thiol group (mercapto group).

Examples of aliphatic polythiol compounds include methanedithiol, 1,2-ethanedithiol, 1,1-propanedithiol, 1,2-propanedithiol, 1,3-propanedithiol, 2,2-propanedithiol, 1,6-hexanedithiol, 1,2,3-propanetrithiol, 1,1-cyclohexanedithiol,1,2-cyclohexanedithiol, 2,2-dimethylpropane-1,3-dithiol, 3,4-dimethoxybutane-1,2-dithiol, 2-methylcyclohexane-2,3-dithiol, 1,1-bis(mercaptomethyl)cyclohexane, bis(2-mercaptoethylester)thiomalate, 2,3-dimercapto-1-propanol(2-mercaptoacetate), 2,3-dimercapto-1-propanol(3-mercaptopropionate), 2,3-dimercapto-1-propanol(3-mercaptobutyrate), diethylene glycol bis(2-mercaptoacetate), diethylene glycol bis(3-mercaptopropionate), diethylene glycol bis(3-mercaptobutyrate), 1,2-dimercaptopropyl methyl ether, 2,3-dimercaptopropyl methyl ether, 2,2-bis(mercaptomethyl)-1,3-propanedithiol, bis(2-mercaptoethyl)ether, ethylene glycol bis(2-mercaptoacetate), ethylene glycol bis(3-mercaptopropionate), ethylene glycol bis(mercaptobutyrate), trimethylolpropane bis(2-mercaptoacetate), trimethylolpropane bis(3-mercaptopropionate), trimethylolpropane bis(3-mercaptobutyrate), pentaerythritol tetrakis(2-mercaptoacetate), pentaerythritol tetrakis(3-mercaptopropionate), pentaerythritol tetrakis(3-mercaptobutyrate) and tetrakis(mercaptomethyl)methane.

Examples of aromatic polythiol compounds include 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,2,4-tris(mercaptoethyl)benzene, 1,3,5-tris(mercaptoethyl)benzene, 2,5-toluenedithiol, 3,4-toluenedithiol, 1,3-di(p-methoxyphenyl)propane-2,2-dithiol, 1,3-diphenylpropane-2,2-dithiol, phenylmethane-1,1-dithiol and 2,4-di(p-mercaptophenyl)pentane.

Examples of aromatic polythiol compounds having a sulfur atom other than a thiol group (mercapto group) include 1,2-bis(mercaptoethylthio)benzene, 1,3-bis(mercaptoethylthio)benzene, 1,4-bis(mercaptoethylthio)benzene, 1,2,3-tris(mercaptomethylthio)benzene, 1,2,4-tris(mercaptomethylthio)benzene, 1,3,5-tris(mercaptomethylthio)benzene, 1,2,3-tris(mercaptoethylthio)benzene, 1,2,4-tris(mercaptoethylthio)benzene, 1,3,5-tris(mercaptoethylthio) benzene and these alkylation products thereof.

Examples of aliphatic polythiols containing a sulfur atom other than a thiol group (mercapto group) include bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptomethylthio)methane, bis(2-mercaptoethylthio)methane, bis(3-mercaptopropylthio)methane, 1,2-bis(mercaptomethylthio)ethane, 1,2-bis(2-mercaptoethylthio)ethane, 1,2-bis(3-mercaptopropyl)ethane, 1,3-bis((mercaptomethylthio)propane, 1,3-bis(2-mercaptoethylthio)propane, 1,3-bis(3-mercaptopropylthio) propane, 1,2,3-tris(mercaptomethylthio)propane, 1,2,3-tris(2-mercaptoethylthio)propane, 1,2,3-tris(3-mercaptopropylthio)propane, 1,2-bis[(2-mercaptoethyl) thio]-3-mercaptopropane, 4-mercaptomethyl-3,6-dithia-1,8-octanedithiol, 4,8-dimercaptomethyl-1,11-mercapto-3,6,9-trithioundecane, 4,7-dimercaptomethyl-1,11-mercapto-3,6,9-trithioundecane, 5,7-dimercaptomethyl-1,11-mercapto-3,6,9-trithiaundecane, tetrakis(mercaptomethylthiomethyl) methane, tetrakis(2-mercaptoethylthiomethyl)methane, tetrakis(3-mercaptopropylthiomethyl)methane, bis(2,3-dimercaptopropyl) sulfide, bis(1,3-dimercaptopropyl) sulfide, 2,5-dimercapto-1,4-dithiane, 2,5-dimercaptomethyl-1,4-dithiane, 2,5-dimercaptomethyl-2,5-dimethyl-1,4-dithiane, bis(mercaptomethyl) disulfide, bis(mercaptoethyl) disulfide, bis(mercaptopropyl) disulfide, and thioglycolates, mercaptopropionates and mercaptobutanoates thereof; hydroxymethylsulfide bis(2-mercaptoacetate), hydroxymethylsulfide bis(3-mercaptopropionate), hydroxymethylsulfide bis(3-mercaptobutyrate), hydroxyethylsulfide bis(2-mercaptoacetate), hydroxyethylsulfide bis(3-mercaptopropionate), hydroxyethylsulfide bis(3-mercaptobutyrate), hydroxypropylsulfide bis(2-mercaptoacetate), hydroxypropylsulfide bis(3-mercaptopropionate), hydroxypropylsulfide bis(3-mercaptobutyrate), hydroxymethyldisulfide bis(2-mercaptoacetate), hydroxymethyldisulfide bis(3-mercaptopropionate), hydroxymethyldisulfide bis(3-mercaptobutyrate), hydroxyethyldisulfide bis(2-mercaptoacetate), hydroxyethyldisulfide bis(3-mercaptopropionate), hydroxyethyldisulfide bis(3-mercaptobutyrate), hydroxypropyldisulfide bis(2-mercaptoacetate), hydroxypropyldisulfide bis(3-mercaptopropionate), hydroxypropyldisulfide bis(3-mercaptobutyrate), 2-mercaptoethyl ether bis(2-mercaptoacetate), 2-mercaptoethyl ether bis(3-mercaptopropionate), 2-mercaptoethyl ether bis(3-mercaptobutyrate), 1,4-dithiane-2,5-diol bis(2-mercaptoacetate), 1,4-dithiane-2,5-diol bis(3-mercaptopropionate), 1,4-dithiane-2,5-diol bis(3-mercaptobutyrate), bis(2-mercaptoethylester) thiodiglycolate, bis(2-mercaptoethylester) thiodipropionate, bis(2-mercaptoethylester) thiodibutanoate, bis(2-mercaptoethylester) 4,4-thiodibutyrate, bis(2-mercaptoethylester) dithiodiglycolate, bis(2-mercaptoethylester) dithiodipropionate, bis(2-mercaptoethylester) dithiodibutanoate, bis(2-mercaptoethylester) 4,4-dithiodibutyrate, bis(2,3-dimercaptopropylester) thiodiglycolate, bis(2,3-dimercaptopropylester) thiodiglycolate, bis(2,3-dimercaptopropylester) thiodibutanoate, bis(2,3-dimercaptopropylester) dithioglycolate, bis(2,3-dimercaptopropylester) dithiodipropionate, and bis(2,3-dimercaptopropylester) dithiodibutanoate.

One type of thiol compound (A) may be used alone or two or more types may be used in combination.

(Isocyanate Compound (B))

Examples of isocyanate compound (B) include diisocyanates, modified isocyanates and triisocyanates.

Examples of diisocyanates include 1,2-diisocyanatobenzene, 1,3-diisocyanatobenzene, 1,4-diisocyanatobenzene, 2,4-diisocyanatotoluene, ethylphenylene diisocyanate, isopropylphenylene diisocyanate, dimethylphenylene diisocyanate, diethylphenylene diisocyanate, diisopropylphenylene diisocyanate, biphenyl diisocyanate, toluidine diisocyanate, 4,4'-methylenebis(phenylisocyanate), 4,4'-methylenebis(2-methylphenylisocyanate), bibenzyl-4,4'-diisocyanate, bis(isocyanatophenyl)ethylene, isophorone diisocyanate, 1,4-tetramethylene diisocyanate, 1,6-hexamethylene diisocyanate, cyclohexane diisocyanate, methylcyclohexane diisocyanate, 4,4'-methylenebis(cyclohexylisocyanate), 4,4'-methylenebis (2-methylcyclohexylisocyanate), 3,8-bis(isocyanatomethyl) tricyclodecane, 3,9-bis(isocyanatomethyl)tricyclodecane, 4,8-bis(isocyanatomethyl)tricyclodecane and 4,9-bis(isocyanatomethyl)tricyclodecane.

Examples of modified isocyanates include biuret and isocyanurate diisocyanates.

Examples of triisocyanates include triisocyanatononane, triphenylmethaneisocyanate triisocyanate, trimethylbenzene triisocyanate, benzene triisocyanate and toluene triisocyanate.

Other examples of isocyanate compound (B) include isocyanate compounds obtained by extending chain length with one or more polyamines and/or polyols using suitable materials and techniques known among persons with ordinary skill in the art.

One type of isocyanate compound (B) may be used alone or two or more types may be used in combination.

(Phosphine Compound (C))

Phosphine compound (C) functions as a catalyst of a reaction consisting of nucleophilic addition to a Michael acceptor (E) followed by the resulting strongly basic zwitterion intermediate reacting with a thiol group and isocyanate group.

Examples of phosphine compound (C) include phosphines and diphosphines.

Examples of phosphines include trimethylphosphine, triethylphosphine, tripropylphosphine, triisopropylphosphine, tri-n-butylphosphine, tri-t-butylphosphine tri-n-octylphosphine, tricyclohexylphosphine, tribenzylphosphine, triphenylphosphine, diphenylmethylphosphine, dimethyphenylphosphine, diphenylcyclohexylphosphine, dicyclohexylphenylphosphine, diethylphenylphosphine, tri-o-tolylphosphine, tri-m-tolylphosphine, tri-p-tolylphosphine, tri-2,4-xylylphosphine, tri-2,5-xylylphosphine, tri-3,5-xylylphosphine, tris(p-methoxyphenyl)phosphine, tris(p-t-butoxyphenyl)phosphine, di-t-butylphenylphosphine, [4-(N,N-dimethylamino)phenyl]di-t-butylphosphine, di-t-butyl (2-butenyl)phosphine, di-t-butyl(3-methyl-2-butenyl) phosphine and trimesitylphosphine.

Examples of diphosphines include 1,2-bis(dimethylphosphino)ethane, bis(diphenylphosphino)methane, 1,2-bis(diphenylphosphino)ethane, 1,2-bis(diphenylphosphino)propane, 1,3-bis(diphenylphosphino)propane, 1,4-bis (diphenylphosphino)butane, 2,3-bis(diphenylphosphino) butane and 1,5-bis(diphenylphosphino)pentane.

One type of phosphine compound (C) may be used alone or two or more types may be used in combination.

Phosphine compound (C) is preferably compound (I) represented by the following formula (I) from the viewpoint of having nucleophilicity suitable for nucleophilic addition to the Michael acceptor (E).

[Chemical Formula 2]

(I)

In the aforementioned formula (I), $X^1$, $X^2$ and $X^3$ respectively represent an alkyl group having 1 to 8 carbon atoms, alkoxy group having 1 to 8 carbon atoms, alkenyl group having 1 to 8 carbon atoms, alkynyl group having 1 to 8 carbon atoms, cycloalkyl group having 3 to 6 carbon atoms, phenyl group, biphenyl group, naphthyl group, phenoxy group or heterocyclic group.

The alkyl group, alkoxy group, alkenyl group and alkynyl group may be respectively be linear or branched.

$X^1$, $X^2$ and $X^3$ may have a substituent.

Examples of substituents include a halogen atom, alkyl group having 1 to 8 carbon atoms, alkoxy group having 1 to 8 carbon atoms, alkenyl group having 1 to 8 carbon atoms, alkynyl group having 1 to 8 carbon atoms, cycloalkyl group having 3 to 6 carbon atoms, amino group, alkylamino group having 1 to 8 carbon atoms, nitro group, phenyl group, biphenyl group, naphthyl group, phenoxy group and heterocyclic group.

(Acid (D))

The acid (D) inhibits the reaction between a thiol group and isocyanate group by forming a complex with the phosphine compound (C).

If the pKa of the acid (D) is 3 or less, acidity is sufficiently high and the effect of inhibiting the reaction between a thiol group and isocyanate group can be obtained.

Since the pKa relative to water of a conjugate acid ($X^1X^2X^3P^+$—H) of phosphine compound (C), such as a conjugate acid of triphenylphosphine, is 2, the pKa of the acid (D) (AH) is sufficiently lower than the pKa of the conjugate acid ($X^1X^2X^3P^+$—H) of phosphine compound (C), or in other words, if the pKa is 1 or less, the acid (D) (AH) easily forms a complex ($X^1X^2X^3P^+$—H·$A^-$) with the phosphine compound (C) ($X^1X^2X^3P$).

Accordingly, the pKa of the acid (D) relative to water is preferably 1 or less, more preferably 0 or less and even more preferably −1 or less. If the pKa of the acid (D) is 1 or less, acidity is sufficiently high and the effect of inhibiting the reaction between a thiol group and isocyanate group can be sufficiently obtained.

Examples of acid (D) include perfluorocarboxylic acids, perfluorosulfonic acids, aromatic sulfonic acids, aliphatic sulfonic acids, reactive sulfonic acids and inorganic acids.

Examples of perfluorocarboxylic acids include trifluoroacetic acid (pKa: 0.1), pentafluoropropionic acid (pKa: 0.4) and perfluoro-n-octanoic acid (pKa: 0.5).

Examples of perfluorosulfonic acids include trifluoromethanesulfonic acid (pKa: −3.9).

Examples of aromatic sulfonic acids include benzenesulfonic acid (pKa: −2.8), p-toluenesulfonic acid (pKa: −2.8), naphthalenesulfonic acid (pKa: 0.3), anthracenesulfonic acid (pKa: 0.2), phenanthracenesulfonic acid (pKa: 0.2), fluorenesulfonic acid (pKa: −0.6), indanesulfonic acid (pKa: −0.4), indenesulfonic acid (pKa: −0.5), tetralinsulfonic acid (pKa: −0.4), acenaphthenesulfonic acid (pKa: 0.7), cumenesulfonic acid (pKa: −0.5), p-xylene-2-sulfonic acid (pKa: −0.5), dodecylbenzenesulfonic acid (pKa: −0.5), nonylnaphthalenesulfonic acid (pKa: 0.4) and 2-aminotoluene-5-sulfonic acid (pKa: −1.1).

Examples of aliphatic sulfonic acids include methanesulfonic acid (pKa: −1.9).

Examples of reactive sulfonic acids include vinylsulfonic acid (pKa: −2.7), styrenesulfonic acid (pKa: −0.6), isoprenesulfonic acid (pKa: −2.7), allyloxybenzenesulfonic acid (pKa: −0.4) and methalyloxybenzenesulfonic acid (pKa: −0.4).

Examples of inorganic acids include sulfuric acid (pKa: −3.2, monovalent acid), hydrochloric acid (pKa: −3.7), nitric acid (pKa: −1.8) and hydrobromic acid (pKa: −4.1).

One type of acid (D) may be used alone or two or more types may be used in combination.

Furthermore, due to the high reaction inhibitory effect of methanesulfonic acid, the change in pot life relative to the added amount of methanesulfonic acid is large. In addition, methanesulfonic acid is toxic. Consequently, it is difficult to use methanesulfonic acid industrially.

The acid (D) is preferably an aromatic sulfonic acid. Since aromatic sulfonic acids have a comparatively high molecular mass, the acid value per unit mass thereof is low and the increase in pot life relative to the amount added is more gradual. As a result, pot life can be easily controlled to an arbitrary time with high accuracy in the reaction between a thiol group and isocyanate group.

(Michael Acceptor (E))

The Michael acceptor (E) is subjected to nucleophilic addition by the phosphine compound (C), and the resulting strongly basic zwitterion intermediate functions as a catalyst of the reaction between a thiol group and an isocyanate group.

The Michael acceptor (E) preferably has at least one olefinic unsaturated group and at least one electron-withdrawing group bonded to a carbon atom of an unsaturated bond of the olefinic unsaturated group.

The olefinic unsaturated bond may be a double bond or triple bond.

Examples of electron-withdrawing groups include a carbonyl group, carboxyl group, ester group, thiocarbonyl group, thiocarboxyl group, thioester group, sulfoxide group, sulfonyl group, sulfo group, phosphate ester, phosphite ester, phosphonate ester, nitro group, nitrile group and amide group.

Examples of the Michael acceptor (E) include (meth) acrylates, N-substituted maleimides, vinyl sulfones, maleic acid derivatives and α,β-unsaturated aldehydes.

Examples of (meth) acrylates include methyl (meth) acrylate, ethylene glycol di(meth)acrylate, trimethylolpropane tri(meth)acrylate and ditrimethylolpropane tetra(meth)acrylate.

Examples of N-substituted maleimides include N-butyl maleimide.

Examples of vinyl sulfones include divinyl sulfone. Examples of maleic acid derivatives include maleic anhydride.

Examples of α,β-unsaturated aldehydes include cinnamaldehyde.

One type of Michael acceptor may be used alone or two or more types may be used in combination.

(Other Components)

The curable composition may also contain monofunctional thiols or monofunctional isocyanates for the purpose of adjusting the crosslink density of the cured product.

The curable composition may also contain additives such as a pigment, ultraviolet absorber, adhesion promoter, stabilizer, antioxidant, antifoaming agent, filler, anti-settling agent, plasticizer, viscosity modifier or solvent as necessary.

(Ratios of Each Component)

The molar ratio (SH/NCO) of all thiol groups to all isocyanate groups present in the curable composition is preferably 0.5/1 to 3/1 and more preferably 0.8/1 to 2/1 from the viewpoints of toughness, impact resistance, abrasion resistance and other mechanical properties of the cured product.

The content of the phosphine compound (C) is 1.3% by mass or less, preferably 0.1% by mass to 1.2% by mass, and more preferably 0.1% by mass to 1.0% by mass, based on 100% by mass of the curable composition. Since pot life can be extended with a small amount of acid (D) if the content of the phosphine compound (C) is equal to or less than the upper limit value of the aforementioned ranges, pot life can be precisely controlled to an arbitrary time without causing a decrease in curability of the curable composition. In addition, if the amount of phosphine compound (C) dissolved in the composition is low, less time is required to prepare the composition. A rapid reaction rate can be obtained if the content of the phosphine compound (C) is equal to or greater than the lower limit value of the aforementioned ranges.

The molar ratio ((D)/(C)) of the acid (D) to the phosphine compound (C) is preferably 0.001 to 1 and more preferably 0.001 to 0.5. If the ratio ((D)/(C)) is within the aforementioned ranges, a pot life of several minutes to several hours can be obtained without completely inhibiting initiation of the reaction.

The molar ratio ((E)/(C)) of the Michael acceptor (E) to the phosphine compound (C) is preferably 0.05 to 20 and more preferably 0.1 to 10. If the ratio ((E)/(C)) is within the aforementioned ranges, the strongly basic zwitterion intermediate can be formed at a rate that is suitable for obtaining a pot life of several minutes to several hours.

(Mechanism of Action)

In the present invention, a co-catalyst consisting of the phosphine compound (C), acid (D) and Michael acceptor (E) is used as a catalyst of the reaction between a thiol group of the thiol compound (A) and an isocyanate group of the isocyanate compound (B). The phosphine compound (C) carries out nucleophilic addition to the Michael acceptor (E) and the strongly basic zwitterion intermediate formed functions as a catalyst of the reaction between the thiol group and isocyanate group. Here, since the acid (D) functions as an inhibitor of the reaction between the thiol group and isocyanate group if included in the co-catalyst, an arbitrary pot life can be obtained due to the generation of a delay in the start of the reaction corresponding to the amount of the acid (D) added. This is the first effect of adding the acid (D).

The following provides a description of the second effect of adding the acid (D). Since the acid (D) forms a complex with the phosphine compound (C), the concentration of phosphine compound (C) that demonstrates nucleophilic addition decreases, and the rate at which the phosphine compound (C) carries out nucleophilic addition on the Michael acceptor (E) decreases. Namely, rapid formation of the strongly basic zwitterion intermediate (catalyst) is inhibited and as a result thereof, the start of the reaction between the thiol group and isocyanate group is delayed, thereby allowing the obtaining of pot life.

Thus, according to the present invention, by selecting the type and amount of the acid (D), pot life can be precisely controlled to an arbitrary time without extending curing time in the reaction between a thiol group of the thiol compound (A) and an isocyanate group of the isocyanate compound (B) and without significantly reducing the amounts of the phosphine compound (C) and Michael acceptor (E).

In addition, in the present invention, since the content of the phosphine compound (C) is 1.3% by mass or less based on 100° by mass of the curable composition, pot life can be extended with only a small amount of the acid (D). Consequently, pot life can be precisely controlled to an arbitrary time without causing a decrease in the curability of the curable composition. In addition, time is not required to prepare the composition since the amount of phosphine compound (C) dissolved in the composition is low.

More specifically, in order to precisely control pot life to an arbitrary time, pot life relative to the amount of acid (D) added (g) per gram of curable composition is preferably 1000 sec/mg to 10000 sec/mg in the case of using 0.5 parts by mass of triphenylphosphine and 0.5 parts by mass of trimethylolpropane triacrylate as catalyst based on a total of 100 parts by mass of pentaerythritol tetrakis (3-mercaptopropionate) and hexamethylene diisocyanate (molar ratio of thiol groups to isocyanate groups is equivalent).

If the pot life relative to the added amount of acid (D) is 1000 sec/mg or more, the effect of extending pot life by addition of acid (D) is adequately obtained, and pot life can be controlled to an arbitrary time as a result thereof. If the pot life relative to the added amount of acid (D) is 10000 sec/mg or less, the rate of change in pot life relative to the added amount of acid (D) is not excessively large, and pot life can be easily controlled to an arbitrary pot life.

<Curable Composition Kit>

Since the thiol compound (A) and the isocyanate compound (B) react even in the absence of a catalyst, the curable composition of the present invention is normally used in the form of a two-component curable composition composed of a composition (X), containing the thiol compound (A) but not containing the isocyanate compound (B), and a composition (Y), containing the isocyanate compound (B) but not containing the thiol compound (A).

Since the acid (D) reacts with the isocyanate compound (B), the acid (D) is contained in the composition (X) that does not contain the isocyanate compound (B).

Since the Michael acceptor (E) reacts with the thiol compound (A), the Michael acceptor (E) is contained in the composition (Y) that does not contain the thiol compound (A).

Since the phosphine compound (C) reacts with the Michael acceptor (E), the phosphine compound (C) is contained in the composition (X) that does not contain the Michael acceptor (E).

Thus, the two-component curable composition is preferably composed of the component (X), which contains the thiol compound (A), the phosphine compound (C) and the acid (D), but does not contain the isocyanate compound (B) or the Michael acceptor (E), and the composition (Y), which contains the isocyanate compound (B) and the Michael acceptor (E), but does not contain the thiol compound (A), the phosphine compound (C) or the acid (D).

The two-component curable composition is preferably supplied in the form of a curable composition kit having a first container housing the composition (X) and a second container housing the composition (Y).

According to the curable composition kit, a two-component curable composition can be provided that does not require time to prepare the composition (X), undergoes little change over time during storage, enables pot life to be precisely controlled to an arbitrary time in a reaction between a thiol group of the thiol compound (A) and an isocyanate group of the isocyanate compound (B) when mixed, and demonstrates superior handling ease.

<Applications>

(Adhesive)

The curable composition of the present invention can be used as an adhesive. In the adhesive of the present invention, superior handling ease is demonstrated when adhering two objects to be adhered as a result of containing the curable composition of the present invention that enables pot life to be precisely controlled.

(Article having Coating Layer)

The curable composition of the present invention can be used as a coating agent.

The article of the present invention has a coating layer that is formed by coating a coating agent containing the curable composition of the present invention on a substrate followed by curing. Since a coating agent containing the curable composition of the present invention is able to use a low molecular mass thiol compound and isocyanate compound to form a coating layer on a substrate by curing, viscosity can be lowered and the use of a solvent can be eliminated. In addition, the article of the present invention demonstrates superior toughness, impact resistance and abrasion resistance of the coating layer since the coating layer is composed of a cured product of the curable composition of the present invention, namely a thiourethane resin.

(Fiber-Reinforced Composite Material)

The curable composition of the present invention can be used as a resin for the matrix of a fiber-reinforced composite material.

The fiber-reinforced composite material of the present invention contains a matrix composed of a cured product of the curable composition of the present invention, and reinforcing fibers. The fiber-reinforced composite material of the present demonstrates superior impregnability of the matrix into the reinforcing fibers, toughness, impact resistance and abrasion resistance since the matrix is composed of a cured product of the curable composition of the present invention, namely a thiourethane resin.

(Optical Substrate)

A cured product of the curable composition of the present invention, namely a thiourethane resin, can be used as an optical substrate due to the high refractive index thereof.

Examples of optical substrates include lenses, prisms, optical fibers and optical filters.

EXAMPLES

Although the following provides a more detailed explanation of the present invention through examples thereof, the present invention is not limited to these examples.

(Pot Life)

Pot life was measured in the manner indicated below. Composition (X) was obtained by adding the phosphine compound (C) and the acid (D) to the thiol compound (A) followed by heating to room temperature or 80° C. to completely dissolve therein. Composition (Y), composed of the isocyanate compound (B) and the Michael acceptor (E), was then added to the composition (X) followed by stirring for 30 seconds at room temperature to obtain a homogeneous mixture.

When the instant at which the composition (Y) was added to the composition (X) was defined as time 0 and the temperature change of the mixture was recorded with the passage of time using a thermocouple, an exothermic peak was obtained after a prescribed amount of time, and the time from the start of mixing to the appearance of the exothermic peak was defined as pot life.

(Curable Composition Kit Preparation Time)

Curable composition kit preparation time was evaluated in the manner described below.

During measurement of pot life as described above, the amount of time until the phosphine compound (C) completely dissolved after adding the phosphine compound (C) and the acid (D) to the thiol compound (A) and heating was measured and evaluated in the manner indicated below.

A: Dissolved within 1 hour and 30 minutes

B: Did not dissolve within 1 hour and 30 minutes (Thiol Compound (A))

PEMP: Pentaerythritol tetrakis(3-mercaptopropionate) (SC Organic Chemical Co., Ltd.)

(Isocyanate Compound (B))

HMDI: Hexamethylene diisocyanate (Tokyo Chemical Industry Co., Ltd.)

(Phosphine Compound (C))

TPP: Triphenylphosphine (Hokuko TPP®, Hokko Chemical Industry Co., Ltd.)

(Michael Acceptor (E))

A-TMPT: Trimethylolpropane triacrylate (NK Ester A-TMPT, Shin-Nakamura Chemical Co., Ltd.)

DVS: Divinyl sulfone (Tokyo Chemical Industry Co., Ltd.)

(Acid)

The pKa value cited in the literature in the case the value was known in the literature, or the calculated value determined using Advanced Chemistry Development (ACD/Labs) software in the case the pKa value was not known, was used for the pKa value of the acid relative to water.

The pKa values cited in Guthrie, et al., Can. J. Chem., 1978, 2342 were used for the pKa values of p-toluenesulfonic acid, benzenesulfonic acid and methanesulfonic acid.

The pKa value cited in Milne and Parker, J. Sol. Chem., 1981, 479 was used for the pKa value of trifluoroacetic acid.

The pKa value cited in Daniel C. Harris, Quantitative Chemical Analysis was used for the pKa value of benzoic acid.

The pKa value cited in the Existing Substances Regulations disclosed by the European Chemicals Agency was used for the pKa value of methacrylic acid.

The melting points contained in the safety data sheet (SDS) of each acid were used for the melting points. Melting point was recorded as 20° C. or higher or under 20° C. after confirming whether the acid was a liquid or solid at 20° C. in the case of acids not having their melting points contained in SDS.

(Examples 1 to 6) In Examples 1 to 6, p-toluenesulfonic acid (hydrate, pKa: −2.8, melting point: 106° C.) was used for the acid (D).

The incorporated amounts of each component are shown in Table 1. TPP and p-toluenesulfonic acid were added to PEMP followed by heating to 80° C. to completely dissolve. The amount of time required for the TPP to completely dissolve was within 1 hour and 30 minutes. Curable composition kit preparation times are also shown in Table 1. After dissolving, a mixture of HMDI and A-TMPT was added followed by stirring for 30 seconds at room temperature to obtain a homogeneous mixture. The results of investigating the manner in which pot life changes as a result of changing the added amount of p-toluenesulfonic acid are summarized in Table 1.

TABLE 1

|     |     | Units | Ex. 1 | Ex. 2 | Ex. 3 | Ex. 4 | Ex. 5 | Ex. 6 |
| --- | --- | --- | --- | --- | --- | --- | --- | --- |
| (A) | PEMP | [g] | 0.64 | 0.63 | 0.64 | 0.64 | 0.62 | 0.61 |
| (B) | HMDI | [g] | 0.43 | 0.43 | 0.44 | 0.43 | 0.43 | 0.44 |
| (C) | TPP | [mg] | 5.9 | 5.4 | 9.9 | 9.9 | 5.3 | 5.2 |
|     |     | [wt %] | 0.51 | 0.50 | 0.50 | 0.51 | 0.50 | 0.49 |
| (D) | p-toluenesulfonic | [mg] | 0.064 | 0.142 | 0.199 | 0.219 | 0.272 | 0.301 |
|     | acid | [wt %] | 0.006 | 0.013 | 0.017 | 0.020 | 0.026 | 0.029 |
|     |     | pKa | −2.9 | −2.9 | −2.9 | −2.9 | −2.9 | −2.9 |
| (E) | A-TMPT | [mg] | 5.7 | 5.6 | 5.7 | 5.6 | 5.6 | 5.8 |
|     |     | [wt %] | 0.53 | 0.52 | 0.52 | 0.52 | 0.53 | 0.55 |
| Molar ratio ((D)/(C)) | | [—] | 0.018 | 0.040 | 0.052 | 0.060 | 0.078 | 0.088 |
| Pot life | | [sec] | 360 | 780 | 1110 | 1320 | 1660 | 1890 |
| Curable composition kit preparation time | | [—] | A | A | A | A | A | A |

On the basis of the results of Examples 1 to 6, pot life was demonstrated to able to be adjusted with only a small added amount of acid (D).

Examples 7 to 12

In Examples 7 to 12, methanesulfonic acid (pKa: −1.9, melting point: 18° C.) was used for the acid (D).

The incorporated amounts of each component are shown in Table 2. The mixtures were prepared using the same method as Example 1. The curable composition kit preparation times are also shown in Table 2. The results of investigating the manner in which pot life changes as a result of changing the added amount of methanesulfonic acid are summarized in Table 2.

TABLE 2

|     |     | Units | Ex. 7 | Ex. 8 | Ex. 9 | Ex. 10 | Ex. 11 | Ex. 12 |
| --- | --- | --- | --- | --- | --- | --- | --- | --- |
| (A) | PEMP | [g] | 0.63 | 0.60 | 0.62 | 0.63 | 0.61 | 0.62 |
| (B) | HMDI | [g] | 0.42 | 0.44 | 0.44 | 0.42 | 0.42 | 0.45 |
| (C) | TPP | [mg] | 5.4 | 5.1 | 5.2 | 5.4 | 5.2 | 5.3 |
|     |     | [wt %] | 0.51 | 0.49 | 0.49 | 0.51 | 0.50 | 0.49 |
| (D) | Methanesulfonic | [mg] | 0.057 | 0.102 | 0.112 | 0.150 | 0.169 | 0.211 |
|     | acid | [wt %] | 0.005 | 0.010 | 0.010 | 0.014 | 0.016 | 0.020 |
|     |     | pKa | −1.9 | −1.9 | −1.9 | −1.9 | −1.9 | −1.9 |
| (E) | A-TMDT | [mg] | 5.1 | 5.4 | 5.4 | 5.2 | 5.2 | 5.5 |
|     |     | [wt %] | 0.49 | 0.51 | 0.50 | 0.49 | 0.50 | 0.51 |
| Molar ratio ((D)/(C)) | | [—] | 0.029 | 0.055 | 0.059 | 0.076 | 0.099 | 0.109 |
| Pot life | | [sec] | 960 | 1540 | 1730 | 2100 | 2590 | 3110 |
| Curable composition kit preparation time | | [—] | A | A | A | A | A | A |

On the basis of the results of Examples 7 to 12, pot life was demonstrated to able to be adjusted with only a small added amount of acid (D).

Examples 13 to 18

In Examples 13 to 18, benzenesulfonic acid (hydrate, pKa: −2.8, melting point: 53° C.) was used for the acid (D).

The incorporated amounts of each component are shown in Table 3. The mixtures were prepared using the same method as Example 1. The curable composition kit preparation times are also shown in Table 3. The results of investigating the manner in which pot life changes as a result of changing the added amount of benzenesulfonic acid are summarized in Table 3.

TABLE 3

|     |                   | Units  | Ex. 13 | Ex. 14 | Ex. 15 | Ex. 16 | Ex. 17 | Ex. 18 |
| --- | ----------------- | ------ | ------ | ------ | ------ | ------ | ------ | ------ |
| (A) | PEMP              | [g]    | 0.64   | 0.63   | 0.64   | 0.64   | 0.65   | 0.64   |
| (B) | HMDI              | [g]    | 0.43   | 0.44   | 0.42   | 0.42   | 0.43   | 0.43   |
| (C) | TPP               | [mg]   | 5.3    | 5.3    | 5.3    | 5.4    | 5.4    | 5.4    |
|     |                   | [wt %] | 0.49   | 0.49   | 0.50   | 0.50   | 0.50   | 0.50   |
| (D) | Benzenesulfonic   | [mg]   | 0.062  | 0.118  | 0.197  | 0.210  | 0.265  | 0.314  |
|     | acid              | [wt %] | 0.006  | 0.011  | 0.018  | 0.020  | 0.024  | 0.029  |
|     | pKa               | [—]    | −2.8   | −2.8   | −2.8   | −2.8   | −2.8   | −2.8   |
| (E) | A-TMPT            | [mg]   | 5.3    | 5.3    | 5.1    | 5.2    | 5.2    | 5.3    |
|     |                   | [wt %] | 0.49   | 0.49   | 0.40   | 0.49   | 0.46   | 0.49   |
| Molar ratio ((D)/(C)) | | [—] | 0.019  | 0.037  | 0.062  | 0.064  | 0.081  | 0.096  |
| Pot life          |       | [sec]  | 440    | 760    | 1130   | 1240   | 1540   | 16900  |
| Curable composition kit preparation time | | [—] | A | A | A | A | A | A |

On the basis of the results of Examples 13 to 18, pot life was demonstrated to able to be adjusted with only a small added amount of acid (D).

Examples 19 to 24

In Examples 19 to 24, naphthalenesulfonic acid (hydrate, pKa: 0.3, no melting point due to decomposition) was used for the acid (D).

The incorporated amounts of each component are shown in Table 4. The mixtures were prepared using the same method as Example 1. The curable composition kit preparation times are also shown in Table 4. The results of investigating the manner in which pot life changes as a result of changing the added amount of naphthalenesulfonic acid are summarized in Table 4.

TABLE 4

|     |                   | Units  | Ex. 19 | Ex. 20 | Ex. 21 | Ex. 22 | Ex. 23 | Ex. 24 |
| --- | ----------------- | ------ | ------ | ------ | ------ | ------ | ------ | ------ |
| (A) | PEMP              | [g]    | 0.62   | 0.62   | 0.63   | 0.63   | 0.62   | 0.62   |
| (5) | HMDI              | [g]    | 0.43   | 0.44   | 0.43   | 0.42   | 0.43   | 0.45   |
| (C) | TPP               | [mg]   | 5.2    | 5.2    | 5.3    | 5.3    | 5.2    | 5.2    |
|     |                   | [wt %] | 0.49   | 0.49   | 0.49   | 0.50   | 0.49   | 0.48   |
| (D) | Benzenesulfonic   | [mg]   | 0.056  | 0.106  | 0.155  | 0.217  | 0.277  | 0.287  |
|     | acid              | [wt %] | 0.005  | 0.010  | 0.014  | 0.020  | 0.026  | 0.027  |
|     | pKa               | [—]    | 0.3    | 0.3    | 0.3    | 0.3    | 0.3    | 0.3    |
| (E) | A-TMPT            | [mg]   | 5.4    | 5.6    | 5.5    | 5.3    | 5.5    | 5.6    |
|     |                   | [wt %] | 0.51   | 0.52   | 0.51   | 0.58   | 0.52   | 0.52   |
| Molar ratio ((D)/(C)) | | [—] | 0.014  | 0.026  | 0.037  | 0.052  | 0.067  | 0.070  |
| Pot life          |       | [sec]  | 410    | 710    | 1010   | 1410   | 1960   | 1960   |
| Curable composition kit preparation time | | [—] | A | A | A | A | A | A |

On the basis of the results of Examples 19 to 24, pot life was demonstrated to able to be adjusted with only a small added amount of acid (D).

Examples 25 to 30

In Examples 25 to 30, vinylsulfonic acid (VSA-H, Asahi Kasei Finechem Co., Ltd., pKa: −2.7, melting point: under 20° C.) was used for the acid (D).

The incorporated amounts of each component are shown in Table 5. The mixtures were prepared using the same method as Example 1. The curable composition kit preparation times are also shown in Table 5. The results of investigating the manner in which pot life changes as a result of changing the added amount of vinylsulfonic acid are summarized in Table 5.

TABLE 5

|     |            | Units  | Ex. 25 | Ex. 26 | Ex. 27 | Ex. 28 | Ex. 29 | Ex. 30 |
|-----|------------|--------|--------|--------|--------|--------|--------|--------|
| (A) | PEMP       | [g]    | 0.63   | 0.63   | 0.61   | 0.64   | 0.65   | 0.63   |
| (B) | HMDI       | [g]    | 9.45   | 0.44   | 0.43   | 0.42   | 0.44   | 0.44   |
| (C) | TPP        | [mg]   | 5.4    | 5.3    | 5.2    | 5.5    | 5.6    | 5.4    |
|     |            | [wt %] | 0.49   | 0.49   | 0.49   | 0.51   | 0.51   | 0.50   |
| (D) | Vinylsulfonic | [mg] | 0.092 | 0.094 | 0.165 | 0.177 | 0.256 | 0.263 |
|     | acid       | [wt %] | 0.009  | 0.009  | 0.016  | 0.017  | 0.023  | 0.024  |
|     | pKa        | [—]    | −2.7   | −2.7   | −2.7   | −2.7   | −2.7   | −2.7   |
| (E) | A-TMPT     | [mg]   | 5.7    | 5.5    | 5.4    | 5.2    | 5.5    | 5.5    |
|     |            | [wt %] | 0.52   | 0.51   | 0.51   | 0.49   | 0.50   | 0.51   |
| Molar ratio ((D)/(C)) | | [—] | 0.037 | 0.038 | 0.077 | 0.078 | 0.111 | 0.118 |
| Pot life | | [sec] | 770 | 810 | 1550 | 1610 | 2250 | 2310 |
| Curable composition kit preparation time | | [—] | A | A | A | A | A | A |

On the basis of the results of Examples 25 to 30, pot life was demonstrated to able to be adjusted with only a small added amount of acid (D).

Examples 31 to 36

In Examples 31 to 36, concentrated sulfuric acid (pKa: −3.2, melting point: 3° C.) was used for the acid (D).

The incorporated amounts of each component are shown in Table 6. The mixtures were prepared using the same method as Example 1. The curable composition kit preparation times are also shown in Table 6. The results of investigating the manner in which pot life changes as a result of changing the added amount of concentrated sulfuric acid are summarized in Table 6.

TABLE 6

|     |            | Units  | Ex. 31 | Ex. 32 | Ex. 33 | Ex. 34 | Ex. 35 | Ex. 36 |
|-----|------------|--------|--------|--------|--------|--------|--------|--------|
| (A) | PEMP       | [g]    | 0.62   | 0.64   | 0.64   | 0.62   | 0.63   | 0.61   |
| (B) | HMDI       | [g]    | 0.42   | 0.44   | 0.43   | 0.43   | 0.43   | 0.43   |
| (C) | TPP        | [mg]   | 5.3    | 5.4    | 5.4    | 5.3    | 5.4    | 5.2    |
|     |            | [wt %] | 0.50   | 0.49   | 0.50   | 0.50   | 0.50   | 0.49   |
| (D) | Concentrated | [mg] | 0.060 | 0.117 | 0.177 | 0.220 | 0.264 | 0.304 |
|     | sulfuric acid | [wt %] | 0.006 | 0.011 | 0.016 | 0.021 | 0.025 | 0.029 |
|     | pKa        | [—]    | −3.2   | −3.2   | −3.2   | −3.2   | −3.2   | −3.2   |
| (E) | A-TMPT     | [mg]   | 5.7    | 5.9    | 5.9    | 5.9    | 5.9    | 5.9    |
|     |            | [wt %] | 0.54   | 0.54   | 0.55   | 0.55   | 0.54   | 0.56   |
| Molar ratio ((D)/(C)) | | [—] | 0.030 | 0.059 | 0.099 | 0.111 | 0.131 | 0.156 |
| Pot life | | [sec] | 470 | 930 | 1370 | 1760 | 2050 | 2520 |
| Curable composition kit preparation time | | [—] | A | A | A | A | A | A |

On the basis of the results of Examples 31 to 36, pot life was demonstrated to able to be adjusted with only a small added amount of acid (D).

Examples 37 to 42

In Examples 37 to 42, trifluoroacetic acid (pKa: 0.2, melting point: −15° C.) was used for the acid (D).

The incorporated amounts of each component are shown in Table 7. The mixtures were prepared using the same method as Example 1. The curable composition kit preparation times are also shown in Table 7. The results of investigating the manner in which pot life changes as a result of changing the added amount of trifluoroacetic acid are summarized in Table 7.

TABLE 7

| | | Units | Ex. 37 | Ex. 38 | Ex. 39 | Ex. 40 | Ex. 41 | Ex. 42 |
|---|---|---|---|---|---|---|---|---|
| (A) | PEMP | [g] | 0.62 | 0.62 | 0.61 | 0.63 | 0.62 | 0.62 |
| (B) | HMDI | [g] | 0.42 | 0.44 | 0.43 | 0.42 | 0.42 | 0.42 |
| (C) | TPP | [mg] | 5.2 | 5.2 | 5.1 | 5.3 | 5.2 | 5.2 |
| | | [wt %] | 0.49 | 0.49 | 0.49 | 0.50 | 0.49 | 0.49 |
| (D) | Trifluoroacetic | [mg] | 0.061 | 0.103 | 0.163 | 0.211 | 0.254 | 0.319 |
| | acid | [wt %] | 0.006 | 0.010 | 0.016 | 0.020 | 0.024 | 0.030 |
| | pKa | [—] | 0.2 | 0.2 | 0.2 | 0.2 | 0.2 | 0.2 |
| (E) | A-TMPT | [mg] | 5.3 | 5.6 | 5.4 | 5.3 | 5.2 | 5.3 |
| | | [wt %] | 0.50 | 0.52 | 0.51 | 0.50 | 0.49 | 0.50 |
| Molar ratio ((D)/(C)) | | [—] | 0.027 | 0.046 | 0.074 | 0.092 | 0.112 | 0.141 |
| Pot life | | [sec] | 510 | 710 | 790 | 900 | 1050 | 1170 |
| Curable composition kit preparation time | | [—] | A | A | A | A | A | A |

On the basis of the results of Examples 37 to 42, pot life was demonstrated to able to be adjusted with only a small added amount of acid (D).

Examples 43 to 47

Examples 43 to 47 were carried out using p-toluenesulfonic acid for the acid (D) and roughly doubling the incorporated amount of TPP in comparison with Examples 1 to 6. The amount of time required for the TPP to completely dissolve was within 1 hour and 30 minutes.

The incorporated amounts of each component are shown in Table 8. The mixtures were prepared using the same method as Example 1. The curable composition kit preparation times are also shown in Table 8. The results of investigating the manner in which pot life changes as a result of changing the added amount of p-toluenesulfonic acid are summarized in Table 8.

TABLE 8

| | | Units | Ex. 43 | Ex. 44 | Ex. 45 | Ex. 46 | Ex. 47 |
|---|---|---|---|---|---|---|---|
| (A) | PEMP | [g] | 0.62 | 0.62 | 0.63 | 0.61 | 0.61 |
| (B) | HMDI | [g] | 0.43 | 0.43 | 0.42 | 0.42 | 0.44 |
| (C) | TPP | [mg] | 10.5 | 10.5 | 10.5 | 10.3 | 10.3 |
| | | [wt %] | 0.98 | 0.98 | 0.98 | 0.98 | 0.97 |
| (D) | p-toluenesulfonic acid | [mg] | 0.107 | 0.207 | 0.340 | 0.426 | 0.528 |
| | | [wt %] | 0.010 | 0.019 | 0.032 | 0.041 | 0.050 |
| | pKa | [—] | −2.8 | −2.8 | −2.8 | −2.8 | −2.8 |
| (E) | A-TMPT | [mg] | 5.5 | 5.5 | 5.4 | 5.4 | 5.5 |
| | | [wt %] | 0.52 | 0.52 | 0.51 | 0.52 | 0.52 |
| Molar ratio ((D)/(C)) | | [—] | 0.016 | 0.030 | 0.049 | 0.063 | 0.079 |
| Pot life | | [sec] | 330 | 630 | 1090 | 1370 | 1690 |
| Curable composition kit preparation time | | [—] | A | A | A | A | A |

On the basis of the results of Examples 43 to 47, pot life was demonstrated to able to be adjusted with only a small added amount of acid (D).

Comparative Examples 1 to 5

In Comparative Examples 1 to 5, methanesulfonic acid (pKa: −1.9, melting point: 18° C.) was used for the acid (D).

The incorporated amounts of each component are shown in Table 9. The mixtures were prepared using the same method as Example 1. The curable composition kit preparation times are also shown in Table 9. TPP did not completely dissolve within 1 hour and 30 minutes and a longer time was required. The results of investigating the manner in which pot life changes as a result of changing the added amount of methanesulfonic acid are summarized in Table 9.

TABLE 9

|     |     | Units | Comp. Ex. 1 | Comp. Ex. 2 | Comp. Ex. 3 | Comp. Ex. 4 | Comp. Ex. 5 |
| --- | --- | --- | --- | --- | --- | --- | --- |
| (A) | PEMP | [g] | 1.22 | 1.23 | 1.25 | 1.22 | 1.22 |
| (F) | HMDI | [g] | 0.85 | 0.84 | 0.84 | 0.84 | 0.85 |
| (C) | TPP | [mg] | 39.9 | 31.2 | 31.7 | 39.9 | 31.9 |
|     |     | [wt %] | 1.41 | 1.42 | 1.43 | 1.41 | 1.41 |
| (D) | Methanesulfonic | [mg] | 4.040 | 8.160 | 12.550 | 16.190 | 20.320 |
|     | acid | [wt %] | 0.185 | 0.372 | 0.566 | 0.739 | 0.922 |
|     | pKa | [—] | −1.9 | −1.9 | −1.9 | −1.9 | −1.9 |
| (E) | DVS | [mg] | 83.2 | 82.5 | 82.5 | 82.5 | 83.7 |
|     |     | [wt %] | 3.80 | 3.76 | 3.72 | 3.77 | 3.80 |
| Molar ratio ((D)/(C)) |  | [—] | 0.350 | 0.700 | 1.060 | 1.402 | 1.754 |
| Pot life |  | [sec] | 340 | 800 | Failed curing | Failed curing | Failed curing |
| Curable composition kit preparation time |  | [—] | B | B | B | B | B |

On the basis of the results of Comparative Examples 1 to 5, a comparatively large added amount of acid (D) (0.394 parts by mass) was demonstrated to be required in order to obtain a pot life of 13 minutes. In addition, when the added amount of acid (D) was increased in order to obtain a longer pot life, curing was demonstrated to fail depending on the added amount Comparative Examples 3 to 5

Comparative Examples 6 to 11

In Comparative Examples 6 to 11, benzoic acid (pKa: 4.2, melting point: 122° C.) was used.

The incorporated amounts of each component are shown in Table 10. The mixtures were prepared using the same method as Example 1. The curable composition kit preparation times are also shown in Table 10. The results of investigating the manner in which pot life changes as a result of changing the added amount of benzoic acid are summarized in Table 10.

TABLE 10

|     |     | Units | Comp. Ex. 6 | Comp. Ex. 7 | Comp. Ex. 8 | Comp. Ex. 9 | Comp. Ex. 10 | Comp. Ex. 11 |
| --- | --- | --- | --- | --- | --- | --- | --- | --- |
| (A) | PEMP | [g] | 0.63 | 0.63 | 0.64 | 0.64 | 0.63 | 0.64 |
| (B) | HMDI | [g] | 0.45 | 0.44 | 0.44 | 0.43 | 0.43 | 0.42 |
| (C) | TPP | [mg] | 5.4 | 5.4 | 5.5 | 5.5 | ..4 | 5.0 |
|     |     | [wt %] | 0.50 | 0.50 | 0.50 | 0.51 | 0.50 | 0.50 |
| (D) | Benzoic acid | [mg] | 0.000 | 0.236 | 0.482 | 0.690 | 0.835 | 1.098 |
|     |     | [wt %] | 0.000 | 0.022 | 0.044 | 0.064 | 0.07A | 0.102 |
|     | pKa | [—] | 4.2 | 4.2 | 4.2 | 4.2 | 4.2 | 4.2 |
| (E) | A-TMPT | [mg] | 5.9 | 5.3 | 5.4 | 5.3 | 5.2 | 5.2 |
|     |     | [wt %] | 0.50 | 0.49 | 0.49 | 0.49 | 0.49 | 0.49 |

TABLE 10-continued

|  | Units | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|
| Molar ratio ((D)/(C)) | [—] | 0.000 | 0.094 | 0.199 | 0.269 | 0.332 | 0.437 |
| Pot life | [sec] | 140 | 140 | 150 | 140 | 140 | 140 |
| Curable composition kit preparation time | [—] | A | A | A | A | A | A |

On the basis of the results of Comparative Examples 6 to 11, pot life was shown to be unable to be changed even if the added amount of acid (D) was changed.

Comparative Examples 12 to 17

In Comparative Examples 12 to 17, methacrylic acid (pKa: 4.7, melting point: 15° C.) was used.

The incorporated amounts of each component are shown in Table 11. The mixtures were prepared using the same method as Example 1. The curable composition kit preparation times are also shown in Table 11. The results of investigating the manner in which pot life changes as a result of changing the added amount of methacrylic acid are summarized in Table 11.

TABLE 11

|  |  | Units | Comp. Ex. 12 | Comp. Ex. 13 | Comp. Ex. 14 | Comp. Ex. 15 | Comp. Ex. 16 | Comp. Ex. 17 |
|---|---|---|---|---|---|---|---|---|
| (A) | PEMP | [g] | 0.63 | 0.63 | 0.63 | 0.64 | 0.64 | 0.63 |
| (B) | HMDI | [g] | 0.44 | 0.43 | 0.43 | 0.44 | 0.43 | 0.43 |
| (C) | TPP | [mg] | 5.3 | 5.3 | 5.3 | 5.4 | 5.4 | 5.4 |
|  |  | [wt %] | 0.49 | 0.49 | 0.49 | 0.49 | 0.50 | 0.50 |
| (D) | Methacrylic acid | [mg] | 0.000 | 0.402 | 0.663 | 0.960 | 1.229 | 1.514 |
|  |  | [wt %] | 0.000 | 0.038 | 0.062 | 0.089 | 0.114 | 0.141 |
|  | pKa | [—] | 4.7 | 4.7 | 4.7 | 4.7 | 4.7 | 4.7 |
| (E) | A-TMPT | [mg] | 6.2 | 6.1 | 6.0 | 6.1 | 6.1 | 6.1 |
|  |  | [wt %] | 0.57 | 0.57 | 0.56 | 0.56 | 0.56 | 0.57 |
| Molar ratio ((D)/(C)) |  | [—] | 0.000 | 0.231 | 0.361 | 0.546 | 0.693 | 0.654 |
| Pot life |  | [sec] | 140 | 120 | 110 | 60 | 50 | 50 |
| Curable composition kit preparation time |  | [—] | A | A | A | A | A | A |

On the basis of the results of Comparative Examples 12 to 17, pot life was shown to be unable to be changed even if the added amount of acid (D) was changed.

In this manner, the use of the co-catalyst indicated in the present invention consisting of the phosphine compound (C), the Michael acceptor (E) and the acid (D) allows the obtaining of a curable composition that enables pot life to be precisely controlled to an arbitrary time in a reaction between a thiol group of the thiol compound (A) and an isocyanate group of the isocyanate compound (B). In addition, a kit for obtaining the curable composition can be easily prepared.

INDUSTRIAL APPLICABILITY

The curable composition of the present invention is extremely useful as an adhesive, coating agent, resin for the matrix of a fiber-reinforced composite material or optical substrate.

The invention claimed is:

1. A curable composition, comprising:
    a thiol compound (A) having at least two thiol groups in a molecule thereof;
    an isocyanate compound (B) having at least two isocyanate groups in a molecule thereof;
    a phosphine compound (C);
    an aromatic sulfonic acid (D) having an acid dissociation constant (pKa) of 3 or less relative to water; and
    a Michael acceptor (E), wherein
    an amount of the phosphine compound (C) is greater than 0% by mass and 1.3% by mass or less based on 100% by mass of the curable composition.

2. The curable composition according to claim 1, wherein the phosphine compound (C) is represented by the formula (I):

wherein, $X^1$, $X^2$ and $X^3$ respectively represent an alkyl group having 1 to 8 carbon atoms, alkoxy group having 1 to 8 carbon atoms, alkenyl group having 1 to 8 carbon atoms, alkynyl group having 1 to 8 carbon atoms, cycloalkyl group having 3 to 6 carbon atoms, phenyl group, biphenyl group, naphthyl group, phenoxy group or heterocyclic group, $X^1$, $X^2$ and $X^3$ may have a substituent, and the substituent is at least one selected from the group consisting of a halogen atom, alkyl group having 1 to 8 carbon atoms, alkoxy group having 1 to 8 carbon atoms, alkenyl group having 1 to 8 carbon atoms, alkynyl group having 1 to 8 carbon atoms, cycloalkyl group having 3 to 6 carbon atoms, amino group, alkylamino group having 1 to 8 carbon atoms, nitro group, phenyl group, biphenyl group, naphthyl group, phenoxy group and heterocyclic group.

3. The curable composition according to claim 1, wherein a molar ratio ((D)/(C)) of the aromatic sulfonic acid (D) to the phosphine compound (C) is 0.001 to 1.

4. curable composition according to claim 1, wherein a pot life relative to an amount (mg) of the aromatic sulfonic acid (D) per gram of the curable composition is 1000 sec/mg to 10000 sec/mg.

5. An adhesive, comprising:
the curable composition according to claim 1.

6. An article, comprising:
a coating layer composed of a cured product of the curable composition according to claim 1.

7. A fiber-reinforced composite material, comprising:
a matrix composed of a cured product of the curable composition according to claim 1; and
reinforcing fibers.

8. A curable composition kit, comprising:
a first container housing a composition (X) comprising a thiol compound (A) having at least two thiol groups in a molecule thereof, a phosphine compound (C) and an aromatic sulfonic acid (D) having an acid dissociation constant (pKa) of 3 or less relative to water; and
a second container housing a composition (Y) comprising an isocyanate compound (B) having at least two isocyanate groups in a molecular thereof and a Michael acceptor (E),
wherein the composition (X) is free of the isocyanate compound (B) or the Michael acceptor (E),
the composition (Y) is free of the thiol compound (A), the phosphine compound (C) or the aromatic sulfonic acid (D), and
an amount of the phosphine compound (C) is greater than 0% by mass and 1.3% by mass or less based on 100% by mass of a total mass of the composition (X) and the composition (Y).

9. The curable composition according to claim 1,
wherein the phosphine compound (C) comprises triphenylphosphine, and
the Michael acceptor (E) comprises trimethylolpropane triacrylate.

10. The curable composition according to claim 1, wherein an amount of the aromatic sulfonic acid (D) is 0.050 mass % or less.

11. The curable composition according to claim 1,
wherein the thiol compound (A) comprises pentaerythritol tetrakis(3-mercaptopropionate), and
the isocyanate compound (B) comprises hexamethylene diisocyanate.

12. The curable composition according to claim 1, wherein the amount of the phosphine compound (C) is 0.98% by mass or less based on 100% by mass of the curable composition.

* * * * *